US008913683B2

(12) United States Patent
Nammi

(10) Patent No.: US 8,913,683 B2
(45) Date of Patent: Dec. 16, 2014

(54) METHODS OF PROVIDING CHANNEL STATE INFORMATION USING DIFFERENT PLURALITIES OF CODEWORDS AND RELATED DEVICES AND SYSTEMS

(75) Inventor: Sairamesh Nammi, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/125,569

(22) PCT Filed: Jul. 11, 2011

(86) PCT No.: PCT/SE2011/050941
§ 371 (c)(1),
(2), (4) Date: Dec. 11, 2013

(87) PCT Pub. No.: WO2013/009228
PCT Pub. Date: Jan. 17, 2013

(65) Prior Publication Data
US 2014/0112407 A1  Apr. 24, 2014

(51) Int. Cl.
*H04B 7/02* (2006.01)
*H04B 7/04* (2006.01)
*H04B 7/06* (2006.01)

(52) U.S. Cl.
CPC ............ *H04B 7/0456* (2013.01); *H04B 7/0486* (2013.01); *H04B 7/0639* (2013.01); *H04B 7/0626* (2013.01)
USPC .......................................... 375/267; 375/299

(58) Field of Classification Search
USPC ........................................ 375/267, 299, 347
See application file for complete search history.

(56) References Cited

U.S. PATENT DOCUMENTS

| 5,781,569 | A  | * | 7/1998  | Fossorier et al. | 714/795 |
|-----------|----|----|---------|------------------|---------|
| 8,401,107 | B2 | * | 3/2013  | Zhang et al.     | 375/267 |
| 8,494,033 | B2 |    | 7/2013  | Jöngren et al.   |         |
| 2008/0080459 | A1 | * | 4/2008 | Kotecha et al. | 370/342 |
| 2008/0095258 | A1 | * | 4/2008 | She et al.     | 375/262 |
| 2009/0268827 | A1 | * | 10/2009 | Clerckx et al. | 375/260 |
| 2011/0032839 | A1 | * | 2/2011 | Chen et al.    | 370/252 |
| 2012/0051450 | A1 | * | 3/2012 | Zangi          | 375/285 |
| 2012/0113851 | A1 | * | 5/2012 | Schober et al. | 370/252 |
| 2012/0114014 | A1 | * | 5/2012 | Gaal et al.    | 375/135 |
| 2012/0250751 | A1 | * | 10/2012 | Kim           | 375/227 |
| 2012/0281773 | A1 | * | 11/2012 | Kent et al.    | 375/259 |
| 2014/0229804 | A1 | * | 8/2014 | Hong et al.    | 714/776 |

OTHER PUBLICATIONS

International Search Report, PCT/SE2011/050941, Apr. 25, 2012.

(Continued)

*Primary Examiner* — Emmanuel Bayard
(74) *Attorney, Agent, or Firm* — Myers Bigel Sibley & Sajovec, P.A.

(57) ABSTRACT

CSI may be provided for a first device communicating with a second device over a MIMO channel using codewords of a precoding codebook. The first and/or second devices support communications over the MIMO channel using a plurality of transmission layers, and the codewords of the precoding codebook are divided into transmission layer groups. Each transmission layer group is provided for a respective one of the transmission layers. At least first and second pluralities of codewords of the precoding codebook are defined. Each of the first and second pluralities includes codewords from each of the transmission layer groups. During a first TTI, respective performance metrics for the first plurality of codewords are determined based on transmissions received at the first device. During a second TTI, respective performance metrics for the second plurality of codewords are determined based on transmissions received at the first device.

16 Claims, 7 Drawing Sheets

(56) References Cited

OTHER PUBLICATIONS

P. Frenger: "MIMO in LTE and LTE-Advanced", Ericsson Research, http://www.commsys.isy.liu.se/MIMO/frenger_slides.pdf; "UE Computations for CSI"; Oct. 5, 2009, pp. 1-33.

B. Tezcan et al.: "Dual Codebook Antenna Method for Spatial Multiplexing MIMO Systems" Military Communications Conference, 2008. MILCOM 2008, IEEE, vol., No., Nov. 16-19, 2008; doi: 10.1109/MILCOM.2008.4753532; pp. 1-7.

A. Ghaderipoor et al.: On the Design, Selection Algorithm and Performance Analysis of Limited Feedback Transmit Beamforming Wireless Communications, IEEE Transactions on vol. 7, No. 12, Dec. 2008, pp. 4948-4957.

L. Wu et al.: "A Low Complexity Limited Feedback Scheme in MIMO Broadcast Channels", Personal, Indoor and Mobile Radio Communications, 2009 IEEE 20$^{th}$ International Symposium on, doi: 10.1109/PIMRC.2009.5450299; Sep. 13-16, 2009, pp. 2449-2453.

Z. Bai et al.: "Dynamic Transmission Mode Selection in LTE/LTE-Advanced System", Applied Sciences in Biomedical and Communication Technologies (ISABEL), 2010 3$^{rd}$ International Symposium; doi: 10.1109/ISABEL.2010.5702841; Nov. 7-10, 2010, pp. 1-5.

I. Emre Telatar: "Capacity of Multi-antenna Gaussian Channels", European Transactions on Telecommunications, vol. 10, Nov. 1999, pp. 585-595.

K. Mukkavilli et al.: "Design of Multiple Antenna Coding Schemes with Channel Feedback", (Proc. Annual Asilomar Conf. on Signal Systems and Components) 2001 IEEE, 0-7803-7147-X; pp. 1009-1013.

H. Sampath et al.: "Generalized Linear Precoder and Decoder Design for MIMO Channels Using the Weighted MMSE Criterion", 2001 IEEE Transactions on Communications, vol. 49, No. 12, Dec. 2001; 0090-6778; pp. 2198-2206.

A. Scaglione et al.: "Optimal Designs for Space-Time Linear Precoders and Decoders", IEEE Transactions on Signal Processing, vol. 50, No. 5, May 2002; pp. 1051-1064.

D. Love et al.: "Quantized Antenna Weighting Codebook Design for Multiple-Input Multiple-Output Wireless Systems", (Proc. 40$^{th}$ Allerton Conf. Communications, Control, and Computing, Moticello, IL, 2002), 2 pages.

NGMN, "UTRA-UTRAN Long Term Evolution (LTE) and 3GPP System Architecture Evolution (SAE)." Last updated Oct. 4, 2006, 8 pages.

* cited by examiner

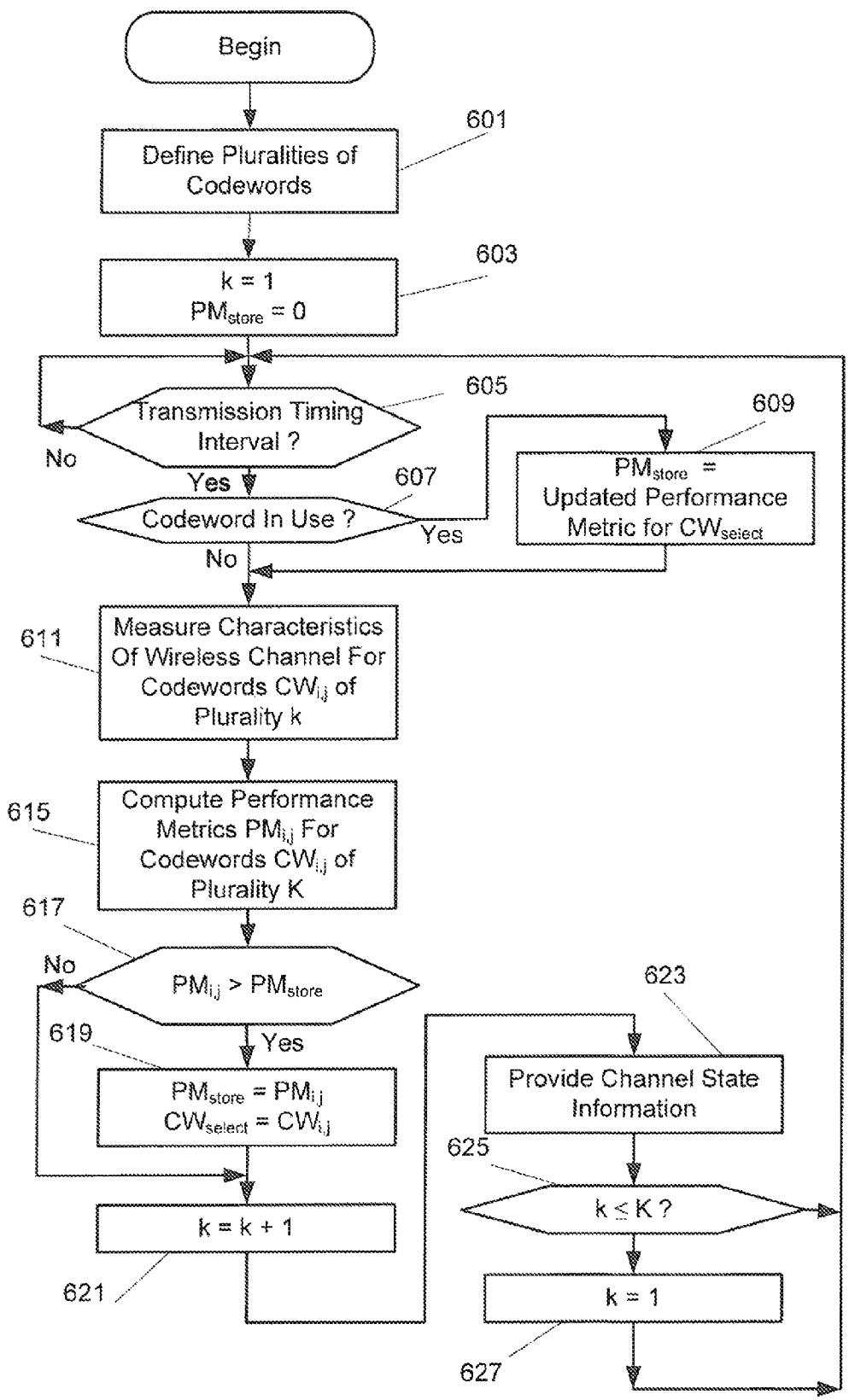

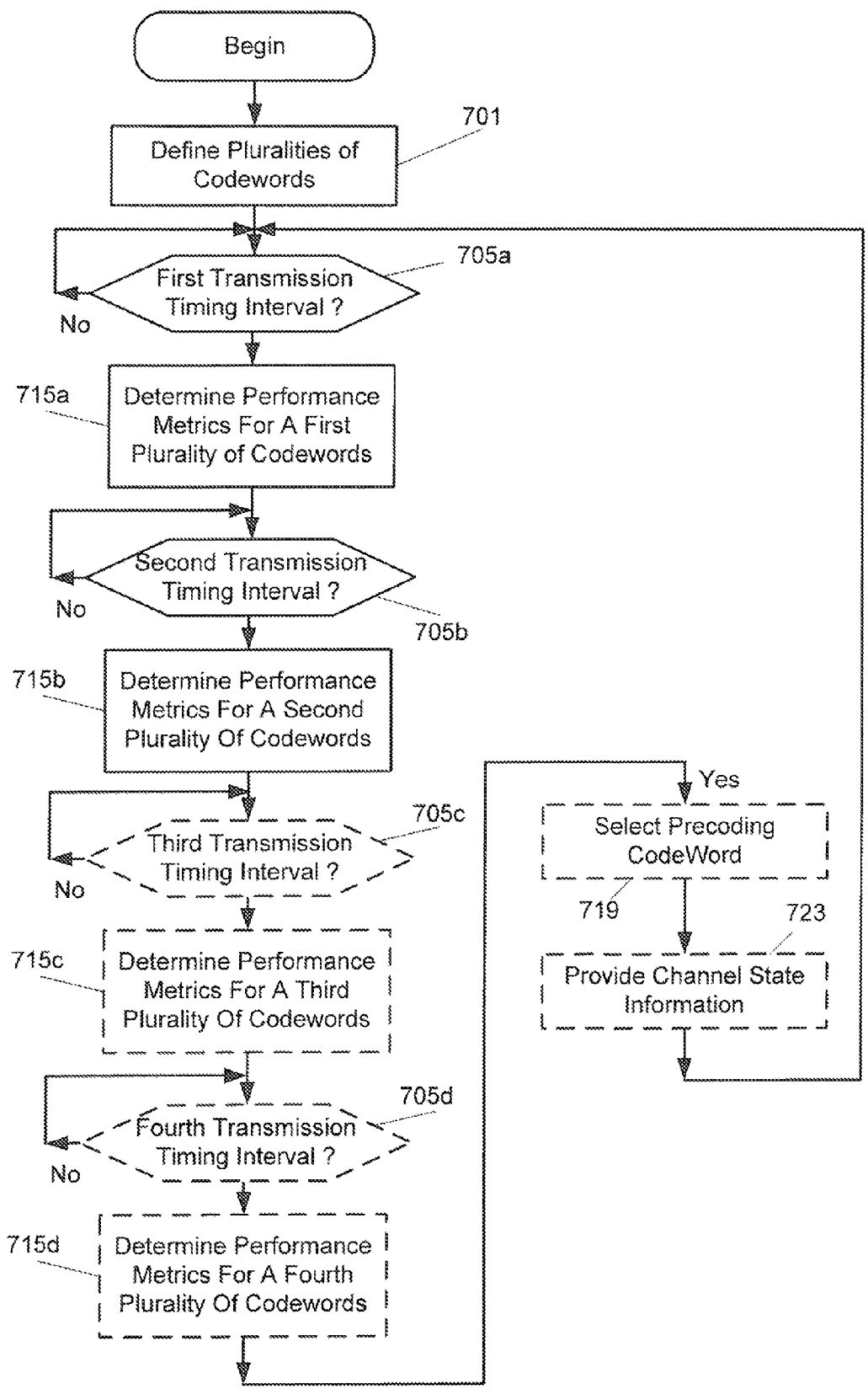

METHODS OF PROVIDING CHANNEL STATE INFORMATION USING DIFFERENT PLURALITIES OF CODEWORDS AND RELATED DEVICES AND SYSTEMS

CROSS REFERENCE TO RELATED APPLICATION

This application is a 35U.S.C. §371national stage application of PCT International Application No. PCT/SE2011/050941, filed on 11Jul. 2011, the disclosure and content of which is incorporated by reference herein in its entirety. The above-referenced PCT International Application was published in the English language as International Publication No. WO 2013/009228A1 on 17Jan. 2013.

TECHNICAL FIELD

The present disclosure is directed to wireless communications and, more particularly, to wireless communications using multiple transmit and receive antennas.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver are equipped with multiple antennas to provide a multiple-input multiple-output (MIMO) communication channel. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from an antenna array over a MIMO channel to a wireless terminal, for example, spatial multiplexing (or SM) may allow the simultaneous transmission of multiple symbol streams over the same frequency from different antennas of the base station antenna array. Stated in other words, multiple symbol streams may be transmitted from different antennas of the base station antenna array to the wireless terminal over the same downlink time/frequency resource element (TFRE) to provide an increased data rate. In a downlink from the same base station transmitting from the same antenna array to the same wireless terminal, transmit diversity (e.g., using space-time codes) may allow the simultaneous transmission of the same symbol stream over the same frequency from different antennas of the base station antenna array. Stated in other words, the same symbol stream may be transmitted from different antennas of the base station antenna array to the wireless terminal over the same time/frequency resource element (TFRE) to provide increased reliability of reception at the wireless terminal due to transmit diversity gain.

The performance of a wireless communication system can thus be improved using multiple antennas at the base station and/or wireless terminal to provide spatial multiplexing SM in more favorable channel conditions and to provide transmit diversity gain in less favorable channel conditions. Transmit diversity and/or spatial multiplexing may be implemented without knowledge of the wireless channel at the transmitter. In many wireless communication standards such as the $3^{rd}$ Generation Partnership Project (3GPP), Long Term Evolution (LTE), High-Speed Downlink Packet Access (HSDPA), and/or Worldwide Interoperability for Microwave Access (WiMAX), however, knowledge of the wireless channel (referred to as channel state information or CSI) may be provided at the MIMO transmitter via feedback from the receiver as discussed, for example, in the $3^{rd}$ Generation Partnership Project document entitled "UTRA-UTRAN Long Term Evolution (LTE) And 3GPP System Architecture Evolution (SAE)" (http://www.3gpp.org/Highlights/LTE/LTE.htm). Accordingly, the MIMO transmitter can use the channel state information (or CSI) to provide precoding to further improve system performance as discussed, for example, by Scaglione et al. in "Optimal Designs For Space-Time Linear Precoders And Decoders" (IEEE Transactions On Signal Processing, Vol. 50, No. 5, May 2002, pages 1051 to 1064) and by Sampath et al. in "Generalized Linear Precoder And Decoder Design For MIMO Channels Using The Weighted MMSE Criterion" (IEEE Transactions On Communications, Vol. 49, No. 12, December 2001, pages 2198 to 2206). CSI precoding can thus be used by a MIMO transmitter to provide beam forming gain and/or to condition transmissions to existing characteristics of the wireless channel.

Communications standards such as 3GPP, LTE, HSDPA, and/or WiMAX may use frequency division duplex (FDD) such that uplink and downlink communications between two communications devices (e.g., between a wireless terminal and a base station) are provided over different carrier frequencies. In such FDD MIMO systems (referred to as limited feedback systems), channel state information may be provided at a MIMO transmitter as feedback information from the receiving device with which it is communicating. For example, a MIMO transmitter at a base station may transmit over a downlink (using a first carrier frequency) to a wireless terminal, and the wireless terminal may provide channel state information for the downlink as feedback that is transmitted over the uplink (using a second carrier frequency different than the first carrier frequency) to the base station. In such limited feedback systems, CSI feedback may be provided, for example, using codebook based feedback and/or quantized channel feedback as discussed, for example, Mukkavilli et al. in "Design Of Multiple Antenna Coding Schemes With Channel Feedback" (Proc Annual Asilomar Conf. On Signal Systems And Components, 2001, pages 1009-1013) and by Love et al. in "Quantized Antenna Weighting Codebook Design For Multiple-Input Multiple-Output Wireless Systems" (Proc. $40^{th}$ Allerton Conf. Communications, Control, And Computing, Moticello, Ill., 2002). Communications standards such as 3GPP, LTE, HSDPA, and WiMAX may use codebook based CSI feedback for precoding.

With codebook based precoding, a same codebook is defined at both the transmitting and receiving devices (e.g., at both the base station and wireless terminal). The codewords (also referred to as entries which may be matrices, vectors, etc.) may be constructed using methods such as Grasmanian, Lyod algorithm, Discrete Fourier transform DFT matrix, etc. At the receiving device (e.g., at the wireless terminal) Signal-to-Interference-and-Noise-Ratios (SINRs) may be calculated for received downlink signals for each of the codewords of the codebook, and a rank and a codeword providing the best performance (e.g., highest spectral efficiency and/or capacity) may be selected for CSI feedback. Because the codewords of the codebook are known at both the transmitting and receiving devices, the receiving device may include a precoding index in the channel state information that is provided to the transmitting device wherein the precoding index uniquely identifies the selected codeword and rank. By providing an index as opposed to the codeword, communication resources may be used more efficiently.

In general, the wireless terminal may decide whether to receive over a downlink in a MIMO diversity mode or in a MIMO multiplexed mode, and the wireless terminal reports this decision using a Rank Indicator (RI). For example, a Rank Indicator of 1 may specify a MIMO diversity mode providing only one symbol stream (also referred to as a transmission layer), a Rank Indicator of 2 may specify a MIMO multiplexed mode simultaneously providing two symbol streams (or transmission layers), a Rank Indicator of 3 may specify a MIMO diversity mode simultaneously providing three symbol streams (or transmission layers), a Rank Indicator of 4 may specify a MIMO multiplexed mode simultaneously providing four symbol streams (or transmission layers), etc. For example, with a four antenna base station transmitter, Rank Indicators from 1 to 4 may be available, and with an eight antenna base station transmitter, Rank Indicators from 1 to 8 may be available. Moreover, the codebook may include multiple codewords for each of the ranks With a four antenna base station transmitter, up to four different transmission layers defined by four respective Rank Indicators (e.g., Rank Indicators 1 to 4) may be available, and 16 codewords may be provided for each transmission layer or rank for a codebook of 64 codewords. With an eight antenna base station transmitter, up to eight different transmission layers defined by eight respective Rank Indicators (e.g., Rank Indicators 1 to 8) may be available, and 16 codewords may be provided for each transmission layer or rank for a codebook of 128 codewords.

Because MIMO downlink channel characteristics vary as a function of many factors including location of the wireless terminal relative to the base station, direction/speed of movement of the wireless terminal, natural and manmade terrain, etc., and because MIMO downlink characteristics and demand for downlink channel capacity may change during a communication, Rank Indicator (RI) and codeword calculations and channel information reporting may be performed by the wireless terminal over the entire band (for example, in 3GPP-LTE, Wi-Max, etc.) at given periods as configured by the base station. Processing overhead for channel state information may thus increase dramatically with increasing transmission layers/antennas.

Rank Indicator (RI or i) and codeword choice is generally a function of channel characteristics, correlation between transmit and receive antennas, etc. A conventional approach to choosing a Rank Indicator (RI or i) and codeword is to find SINRs for different transmission configurations, and to choose a Rank Indicator and codeword for a configuration providing a best performance. For example, a wireless terminal may compute an SINR for each possible value of RI/codeword and find spectral efficiencies using an exhaustive search of all possible configurations (i.e., using all possible codewords). The wireless terminal may then choose the Rank Indicator and codeword for the configuration providing the best performance (e.g., highest efficiency and/or capacity). The wireless terminal may then report the selected Rank Indicator (RI or i) and codeword to the base station in a Channel State Information (CSI) report. These operations may be particularly burdensome when the codebook is large.

While performance of a closed loop MIMO system may generally improve with larger codebooks, the requirement for the receiving device (e.g., wireless terminal) to periodically determine performances (e.g., efficiencies and/or capacities) for all possible downlink configurations (e.g., to periodically calculate performances for each possible codeword) may place a burden on wireless terminal processing capacity and/or may reduce wireless terminal battery life.

SUMMARY

It is therefore an object to address at least some of the above mentioned disadvantages and/or to improve performance in a wireless communication system.

According to some embodiments, channel state information (CSI) may be provided for a first communication device communicating with a second communication device over a multiple input multiple output (MIMO) wireless channel using precoding codewords of a precoding codebook. The first and/or second communication devices may support communications over the multiple input multiple output wireless channel using a plurality of transmission layers, and the precoding codewords of the precoding codebook may be divided into transmission layer groups with each transmission layer group of precoding codewords being provided for a respective one of the transmission layers. At least first and second pluralities of precoding codewords of the precoding codebook may be defined with each of the at least first and second pluralities of precoding codewords including precoding codewords from each of the transmission layer groups. During a first transmission time interval, respective performance metrics may be determined for the first plurality of precoding codewords of a precoding codebook for the MIMO wireless channel based on transmissions received at the first communications device from the second communication device. During a second transmission time interval after the first transmission time interval, respective performance metrics may be determined for the second plurality of precoding codewords of the precoding codebook for the MIMO wireless channel based on transmissions received at the first communication device from the second communication device. Moreover, the first and second pluralities of precoding codewords may be different.

Accordingly, only a subset of the codewords is considered during any given transmission timing interval thereby reducing processing overhead/capacity that is consumed at the receiving device to compute channel state information during each transmission timing interval. A selected codeword may be carried forward for consideration with a next subset of the codewords during a next transmission timing interval, and all of the codewords may be considered over a series of consecutive transmission timing intervals. If the codewords are divided into four subsets, for example, every codeword may be considered over four consecutive transmission timing intervals.

According to some other embodiments, a communication device may include a transceiver and a processor coupled to the transceiver. The transceiver may be configured to provide communications with a second communication device over a multiple input multiple output (MIMO) wireless channel using precoding codewords of a precoding codebook. The communication device may support communications over the multiple input multiple output wireless channel using a plurality of transmission layers, and the precoding codewords of the precoding codebook may be divided into transmission layer groups with each transmission layer group of precoding codewords being provided for a respective one of the transmission layers. A processor may be coupled to the transceiver with the processor being configured to determine respective performance metrics for a first plurality of precoding codewords of the precoding codebook for the MIMO wireless channel based on transmissions received through the transceiver from the second communication device during a first transmission time interval. The processor may be further configured to determine respective performance metrics for a second plurality of precoding codewords of the precoding codebook for the MIMO wireless channel based on transmissions received through the transceiver from the second communication device during a second transmission time interval after the first transmission time interval. Moreover, the first and second pluralities of precoding codewords may be different, the first plurality of precoding codewords may include precoding codewords from each of the transmission layer groups, and the second plurality of precoding codewords may include precoding codewords from each of the transmission layer groups.

According to some embodiments, a method of providing channel state information for a first communication device communicating with a second communication device over a multiple input multiple output (MIMO) wireless channel may be provided. The method may include determining respective performance metrics for a first plurality of precoding codewords of a precoding codebook for the MIMO wireless channel based on transmissions received at the first communications device from the second communication device during a first transmission timing interval. During a second transmission timing interval after the first transmission timing interval, respective performance metrics may be determined for a second plurality of precoding codewords of the precoding codebook for the MIMO wireless channel based on transmissions received at the first communications device from the second communication device. More particularly, the first and second pluralities of precoding codewords may be different.

According to some other embodiments, a method providing channel state information (CSI) for a first communication device communicating with a second communication device over a multiple input multiple output may be provided. More particularly, the wireless channel may use a plurality of transmission layers and a precoding codebook including a plurality of precoding codewords, and the precoding codewords of the precoding codebook may be divided into transmission layer groups for the respective transmission layers. The method may include defining different pluralities of the precoding codewords wherein each plurality of the precoding codewords includes precoding codewords from each of the transmission layer groups. During respective different transmission timing intervals, respective performance metrics may be determined for the different pluralities of the precoding codewords for the multiple input multiple output wireless channel based on transmissions received at the first communications device from the second communication device.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 6 is a flow chart illustrating operations of selecting codewords according to some embodiments.

FIG. 7 is a flow chart illustrating operations of selecting codewords according to some embodiments.

DETAILED DESCRIPTION

Figure 1:
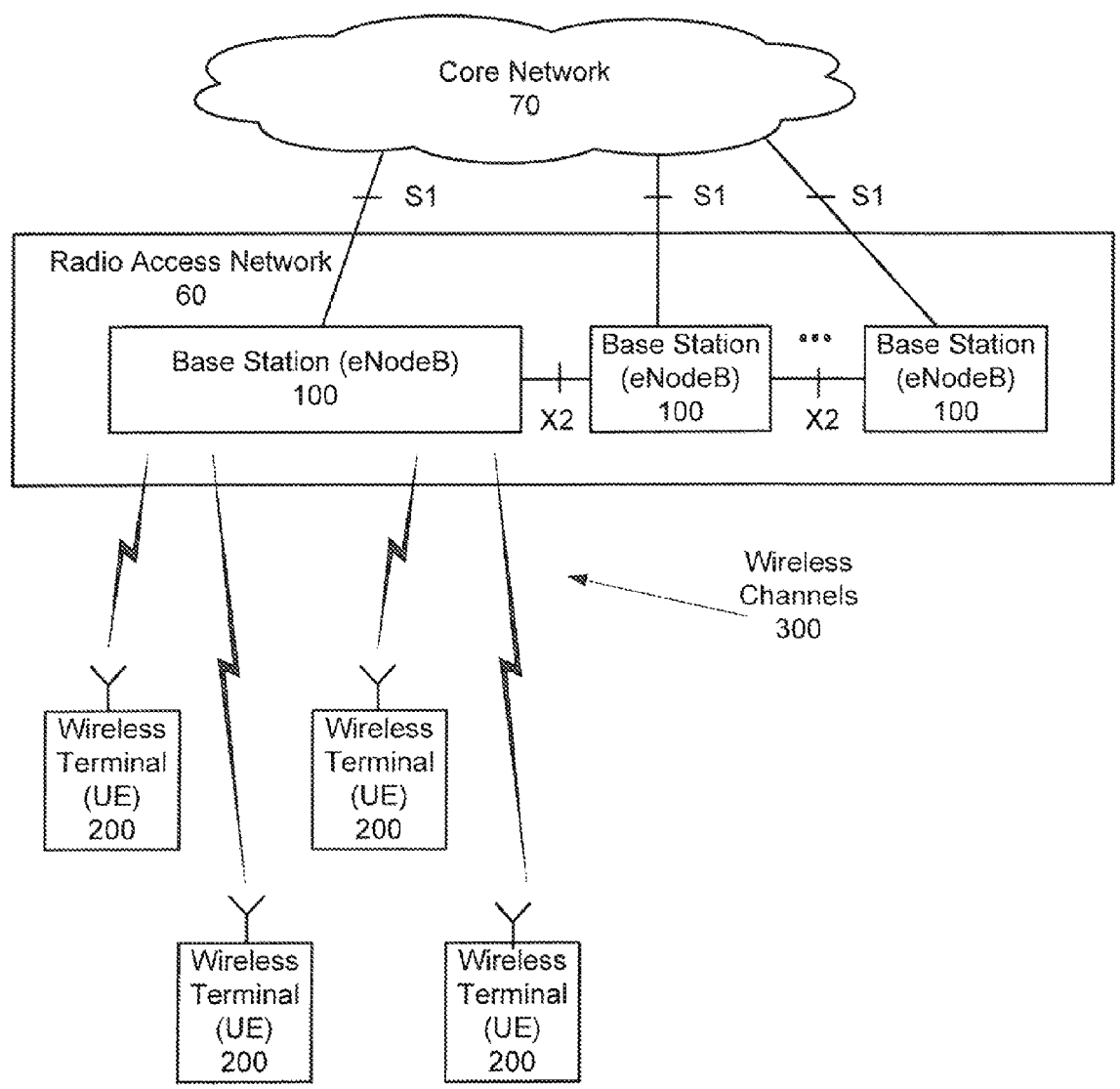
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminals or UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 1 is a block diagram of a communication system that is configured to operate according to some embodiments of the present invention. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
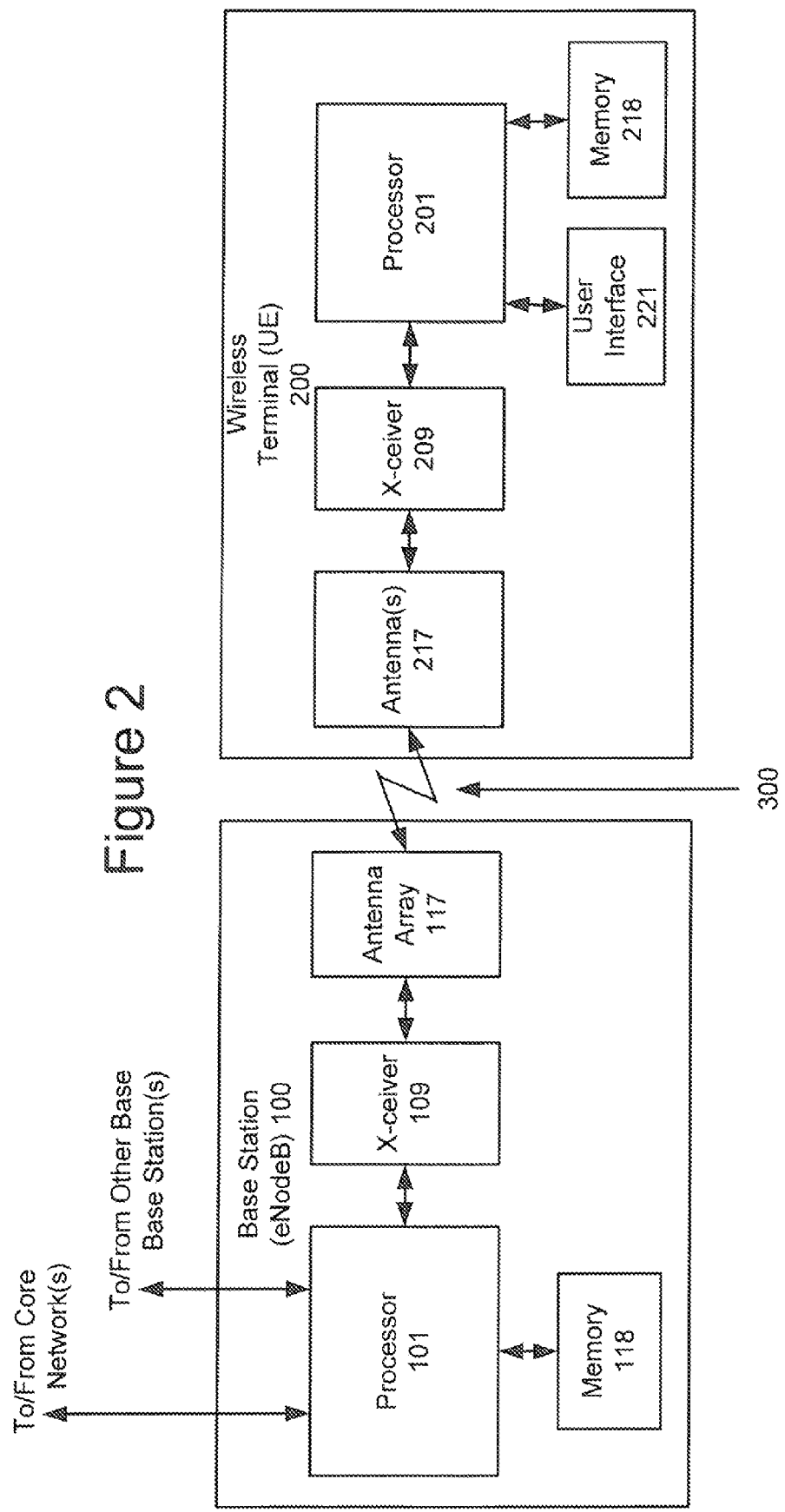
FIG. 2 is a block diagram of a base station and a wireless terminal (UE) in communication over a wireless channel according to some embodiments of FIG. 1.

FIG. 2 is a block diagram of a base station 100 and a wireless terminal 200 of FIG. 1 in communication over a wireless channel 300 according to some embodiments of the present invention. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna(s) 217 and processor 201, and user interface 221 and memory 218 may be coupled to processor 201. Accordingly, base station 100 may transmit communications through transceiver 109 and antenna array 117 for reception at wireless terminal 200 through antenna(s) 217 and transceiver 209, and wireless terminal 200 may transmit communications though transceiver 209 and antenna(s) 217 for reception at base station 100 through antenna array 117 and transceiver 109.

As discussed herein, a rank indicator RI may indicate a number of MIMO transmission layers used to provide respective symbol streams in downlink transmissions from base station 100 to wireless terminal 200. With 4 MIMO antennas providing four different transmission layers or ranks, rank indicators i of 1 to 4 may be available. A rank indicator i of 1, for example, may indicate transmit diversity communications for transmissions from base station 100 to wireless terminal 200 so that the same symbol stream is transmitted from all antennas of antenna array 117 over the same time/frequency resource element to provide increased reliability. A rank indicator of 2 may indicate multiplexed communications for transmission from base station 100 to wireless terminal 200 so that two different symbol streams are simultaneously transmitted from respective different antennas of antenna array 117 over the same time/frequency resource element to provide an increased data rate. A rank indicator of 3 may indicate multiplexed communications for transmission from base station 100 to wireless terminal 200 so that three different symbol streams are simultaneously transmitted from respective different antennas of antenna array 117 over the same time/frequency resource element to provide a further increased data rate. A rank indicator of 4 may indicate multiplexed communications for transmission from base station 100 to wireless terminal 200 so that four different symbol streams are simultaneously transmitted from respective different antennas of antenna array 117 over the same time/frequency resource element to provide yet a further increased data rate.

Referring again to FIG. 2, wireless terminal 200 transceiver 209 is configured to provide wireless communications with base station 100 through antenna(s) 217 and over wireless channel 300. In addition, processor 201 is configured to measure characteristics of wireless channel 300 over which wireless communications are received from base station 100, to select a rank indicator and codeword responsive to measuring the characteristics of the wireless channel 300, and to transmit channel state information based on the selected rank indicator and codeword to base station 100 through the transceiver 209 and the antenna 217. Processor 201 is then configured to process signals received from the antenna array 117 of the base station 100 in accordance with the reported/selected channel state information and/or the reported/selected rank indicator. MIMO and rank indicators and codewords are discussed, for example, in U.S. application Ser. No. 12/973, 096 entitled "Methods Providing Precoder Feedback Using Multiple Precoder Indices And Related Communications Devices And Systems" and filed Dec. 20, 2010.

Processor 101 of base station 100 may thus be configured to provide codebook based precoding for downlink transmissions to wireless terminal 200 based on channel state information CSI for the downlink received from wireless terminal over an uplink. More particularly, the codebook based precoding may be based on a precoding codebook including codewords (also referred to as codebook elements), and each codeword/element of the codebook may include a matrix and/or a vector. Moreover, each codeword may be identified using a codeword index, and the codebook, the codewords of the codebook, and the codeword indices are known to both processor 101 of base station 101 and to processor 201 of wireless terminal 200. Accordingly, processor 201 of wireless terminal 200 may select a codeword and then transmit the respective codeword index that identifies the selected codeword to base station 100 without transmitting the codeword. By transmitting the codeword index instead of the codeword, communications capacity may be more efficiently used.

Antenna array 117 of base station 100 may include a plurality of MIMO antennas allowing base station 100 to transmit downlink communications to wireless terminal 200 using a plurality of transmission layers or ranks (with the highest transmission layer or rank being equal to the number of antennas of array 117) identified using respective rank indicators RI and using a precoding codebook including a plurality of codewords for each transmission layer or rank. A table of precoder ranks R_i, rank indicators i, and codewords CW is provided below in Table 1 by way of example.

TABLE 1

Precoding Codebook

| Precoding Rank (R_i) | Rank Ind. (i) | Codewords ($CW_{i,j}$) For Precoding Codebook | | | |
|---|---|---|---|---|---|
| R_1 | 1 | $CW_{1,1}$ | $CW_{1,2}$ | ... | $CW_{1,J}$ |
| R_2 | 2 | $CW_{2,1}$ | $CW_{2,2}$ | ... | $CW_{2,J}$ |
| ... | ... | ... | ... | ... | ... |
| R_I | I | $CW_{I,1}$ | $CW_{I,2}$ | ... | $CW_{I,J}$ |

In Table 1, I is the number of MIMO antennas of array 117 (and thus the number of available transmission layers or ranks), J is the number of codewords assigned to each transmission layer or rank, i identifies a particular rank (and may have a value from 1 to I), and j identifies a particular codeword for a rank (and may have a value from 1 to J). With antenna array 117 including four MIMO antennas (providing four transmission layers or ranks) and with the codebook including 64 codewords according to the 3GPP LTE standard, for example, I=4 and J=16 so that sixteen codewords are provided for each transmission layer or rank. The resulting ranks and codewords are provided as shown in Table 2.

TABLE 2

Precoding Codebook for a 4 antenna system with 64 codewords.

| Precoding Rank (R_i) | Rank Ind. (i) | Codewords ($CW_{i,j}$) For Precoding Codebook | | | |
|---|---|---|---|---|---|
| R_1 | 1 | $CW_{1,1}$ | $CW_{1,2}$ | ... | $CW_{1,16}$ |
| R_2 | 2 | $CW_{2,1}$ | $CW_{2,2}$ | ... | $CW_{2,16}$ |
| R_3 | 3 | $CW_{3,1}$ | $CW_{3,2}$ | ... | $CW_{3,16}$ |
| R_4 | 4 | $CW_{4,1}$ | $CW_{4,2}$ | ... | $CW_{4,16}$ |

While some embodiments are discussed below with respect to a four antenna base station transmitter using the 64 element codebook of Table 2 (according to the 3GPP LTE standard) by way of example, other antenna arrays and/or other codebook sizes may be used. According to other embodiments, for example, antenna array 117 may include eight MIMO antennas and the codebook of Table 1 may include 128 codewords so that I=8 and J=16 with sixteen codewords being provided for each of the eight transmission layers or ranks. According to still other embodiments, antenna array 17 may include 2, 4, 8, 16, 32, etc. MIMO antennas, and/or the codebook may include 8, 16, 32, 64, 128, 256, etc. codewords that may be evenly divided among the transmission layers or ranks.

Using the 64 codeword codebook of Table 2 with antenna array 117 including 4 antennas according to the 3GPP standard, the 64 codewords of the codebook may be partitioned into K different pluralities/groups of codewords to provide separate pluralities of codewords for processing during different transmission timing intervals (TTI). Moreover, each of the K pluralities of codewords may include codewords from each rank or transmission layer. With K different pluralities of codewords, all of the codewords may be considered over K consecutive transmission timing intervals, and the separate pluralities of codewords from Table 2 may be provided, for example, as shown below in Table 3.

TABLE 3

Precoding Codebook for a 4 antenna system with 64 codewords

| Group | Codewords ($CW_{i,j}$) For Each Precoding Codebook Group |
|---|---|
| k = 1 | $CW_{1,1}$-$CW_{1,4}$, $CW_{2,1}$-$CW_{2,4}$, $CW_{3,1}$-$CW_{3,4}$, and $CW_{4,1}$-$CW_{4,4}$ |
| k = 2 | $CW_{1,5}$-$CW_{1,8}$, $CW_{2,5}$-$CW_{2,8}$, $CW_{3,5}$-$CW_{3,8}$, and $CW_{4,5}$-$CW_{4,8}$ |
| k = 3 | $CW_{1,9}$-$CW_{1,12}$, $CW_{2,9}$-$CW_{2,12}$, $CW_{3,9}$-$CW_{3,12}$, and $CW_{4,9}$-$CW_{4,12}$ |
| k = 4 | $CW_{1,13}$-$CW_{1,16}$, $CW_{2,13}$-$CW_{2,16}$, $CW_{3,13}$-$CW_{3,16}$, and $CW_{4,13}$-$CW_{4,16}$ |

In the following discussion, L is the total number of codewords in the codebook such that L=I*J (e.g., L=64 in the example of Table 3), and K is the number of different groups/pluralities of codewords into which the codebook is divided and thus the number of different transmission timing intervals required to consider all codewords of the codebook (e.g., K=4 in the example of Table 3). Moreover, M is the number of codewords per rank considered during one transmission timing interval such that M=J/K (e.g., M=4 in the example of Table 3). Lower case k identifies the particular plurality/group of codewords and may have a value from 1 to K.

Operations of wireless terminal 200 will now be discussed in greater detail below with reference to FIGS. 2 and 3 and Table 3. In general, base station 100 may provide communications for wireless terminal 200 over wireless channel 300 with downlink communications being transmitted from base station 100 to wireless terminal 200 over a downlink carrier frequency and with uplink communications being transmitted from wireless terminal 200 to base station 100 over an uplink carrier frequency (different than the downlink carrier frequency). Accordingly, base station 100 may support communications between wireless terminal 200 and another wired or wireless communications device (e.g., a landline telephone, another wireless device, a radiotelephone, etc.) through another base station(s), core network, and/or public switched telephone network. Processor 101 of base station 100 may thus provide downlink communications that are transmitted by transceiver 109 through antenna array 117 over wireless channel 300 over the downlink carrier frequency, and then received by antenna(s) 217 and transceiver 209 of wireless terminal 200. Processor 201 of wireless terminal 200 may then provide the downlink communication as audio and/or video output through user interface 221 and/or processor 201 may store information from the downlink communication in memory 218. In the other direction, processor 201 of wireless terminal 200 may generate an uplink communication (e.g., audio, video, and/or data) that is transmitted through transceiver 209 and antenna(s) 217 over wireless channel 300 over the uplink carrier frequency, and then received by antenna array 117 and transceiver 109 of base station 100. Processor 201, for example, may generate uplink communications responsive to audio input (e.g., voice received through a microphone), image/video input (received through a camera), data input (received through a keypad), etc. received through user interface 221 and/or memory 218.

As discussed above, processor 101 of base station 100 may use codebook based precoding to precode downlink communications before transmission through transceiver 109 and antenna array 117 over the downlink of wireless channel 300. Moreover, processor 201 of wireless terminal 200 may select the codeword of the codebook to be used for the downlink communications, and processor 201 may transmit channel state information including an identification of the selected codeword through transceiver 209 and antenna(s) 217 over the uplink of the wireless channel 300. This channel state information may be received through antenna array 117 and transceiver 109 of base station 100, and the channel state information may be used by processor 101 to identify the codeword of the codebook selected by processor 201 of wireless terminal 200.

Operations of wireless terminal 200 selecting codewords are discussed in greater detail below with respect to FIG. 3. For purposes of discussion of operations of FIG. 3, the 4 rank (I=4) 64 codeword (L=64 and J=16) codebook of Table 2 and the divisions (K=4) thereof of Table 3 will be discussed by way of example. Accordingly, four codewords (M=4) of each rank (i=1 to 4) may be considered during each transmission timing interval.

Figure 3:
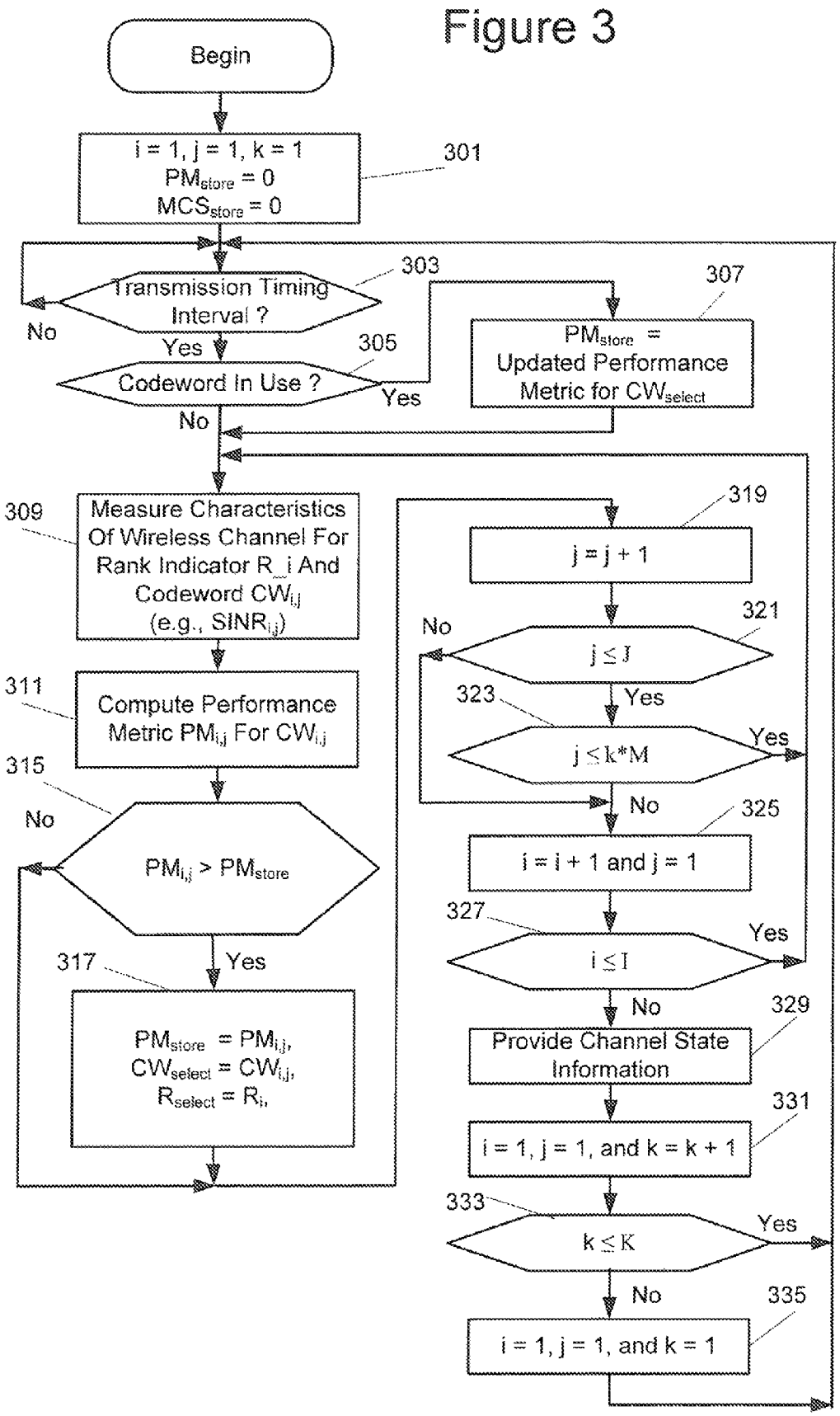
FIG. 3 is a flow chart illustrating operations of selecting codewords according to some embodiments.

At block 301 of FIG. 3 (before a codeword has been selected on the basis of performance), processor 201 may initialize the values i (i=1), j (j=1), and k (k=1) used to iterate through codewords $CW_{i,j}$ during different transmission timing intervals (TTIs). As noted above, i represents the rank of the codeword being considered, j represents the codeword within the rank being considered, and k represents the codeword plurality/group being considered. Moreover, a stored performance metric $PM_{store}$ store and a stored modulation and coding scheme $MCS_{store}$ may be initialized to zero. At block 303, processor 201 may wait until a next transmission timing interval (TTI) before proceeding with evaluation of codewords based on downlink transmission from base station 100 over wireless channel 300. The TTI, for example, may be 2 ms according to the HSPDA standard, and/or the TTI may be 10 ms, 20 ms, 40 ms, or even 80 ms according to the UMTS standard. Accordingly, processor 201 may wait for the duration of a TTI before initiating evaluation of a next group of codewords of the codebook. Once a first codeword has been selected for a communications session, operations of block 301 may be omitted for subsequent transmission timing intervals because the previously selected codeword and its performance metric may be used as a basis for subsequent codeword selections.

Once a next transmission timing interval has arrived at block 303, processor 201 may determine at block 305 if a codeword of the codebook has been previously selected for the downlink from base station 100. If a previously selected codeword $CW_{select}$ is currently in use at block 305, processor 201 may compute a current performance metric (e.g., spectral efficiency and/or capacity) for the previously selected codeword CW select based on current downlink transmissions, and processor 201 may save the current performance metric for the previously selected codeword $CW_{select}$ as $PM_{store}$ at block 307. By saving the current performance metric for the previously selected codeword $CW_{select}$ as $PM_{store}$ at the beginning of a transmission timing interval, a more accurate comparison of performance metrics of the selected codeword $CW_{select}$ and other codewords $CW_{i,j}$ may be provided by accounting for changes in the wireless channel 300 that may have occurred since codeword $CW_{select}$ as selected during a prior transmission timing interval. According to other embodiments, blocks 305 and 307 may be omitted if changes of wireless channel 300 occur slowly relative to a length of the transmission timing interval. As discussed in greater detail below, selected codeword CW select may be maintained until another codeword $CW_{i,j}$ providing better performance is identified. Accordingly, a new codeword $CW_{i,j}$ will not be selected during the transmission timing interval unless one of the considered codewords $CW_{i,j}$ is expected to provide an improvement in performance.

If no codeword has been previously selected for the downlink of wireless channel 300 (e.g., if the TTI interval is the first since the downlink carrier frequency was assigned to wireless terminal 200), $PM_{store}$ may be maintained as zero from block 301. With $PM_{store}=0$, a new codeword $CW_{i,j}$ will be selected during the transmission timing interval.

At block 309, a characteristic(s) (such as $SINR_{i,j}$) of the downlink of wireless channel 300 may be measured by processor 201 for a first codeword $CW_{1,1}$ of the first rank (so that i=1 and j=1). At block 311, processor 201 may compute a performance metric $PM_{1,1}$ (e.g., precoding spectral efficiency and/or capacity) for the codeword $CW_{1,1}$ based on the measured characteristic of the downlink of wireless channel 300. By way of example, the performance metric $PM_{1,1}$ may be computed, for example, as a precoding spectral efficiency (PSE) based on the respective modulation and coding scheme ($MCS_{1,1}$), MCS code rate (CR), and number of bits per modulation symbol (N), such that:

$$PSE\_{i,j} = R\_i \times CR \times N.$$

According to some other embodiments, the performance metric $PM_{1,1}$ may be computed as a capacity based on a signal-to-interference-and-noise-ratio ($SINR_{1,1}$) for the respective codeword, for example, using a Shanon capacity formula. According to still other embodiments, the performance metric may be based on a combination of efficiency, capacity, and/or other performance characteristics.

If an expected performance of codeword $CW_{1,1}$ exceeds the performance of the previously selected codeword $CW_{select}$ (e.g., $PM_{1,1} > PM_{store}$) at block 315, the performance metric $PM_{1,1}$ is saved in memory 218 as the stored performance metric $PM_{store}$, the codeword $CW_{1,1}$ or an identification thereof (e.g., a codeword index) is saved in memory 218 as the selected codeword $CW_{select}$, and the rank R=1 is saved in memory 218 as $R_{select}$ at block 317. Otherwise, if the performance of codeword $CW_{1,1}$ does not exceed the performance of the previously selected codeword $CW_{select}$ (e.g., $PM_{1,1} < PM_{store}$) at block 315, block 317 may be skipped so that $PM_{store}$, $CW_{select}$, and $R_{select}$ are maintained unchanged in memory 218.

At block 319, j (the codeword within the rank i being considered) may be incremented. At block 321, processor 201 may check that the incremented value of j does not exceed a highest possible value of j (e.g., that j does not exceed the number of codewords provided for a rank in the codebook), and at block 323, processor 201 may check that the incremented value of j does not exceed the highest number of the codewords being considered for each rank during the present transition time interval (e.g., k*M). In the example being discussed, K=4 is the number of transmission timing intervals required to consider all codewords of the codebook, and M=4 is the number of codewords of a rank considered during a transition time interval. If J is evenly divisible by K so that the same number of codewords are considered for each group k, block 321 may be omitted. In other words, block 321 provides an end of iterations of j in the event that a last group of codewords corresponding to k=K includes fewer codewords that other groups corresponding to k=1 to k=K−1.

For the first rank i=1 and for k=1 in the example with 64 codewords evenly divided between 4 ranks (I=4) and divided into four groups (K=4), blocks 319, 321, and 323 provide iterations through operations of blocks 309, 311, 315, and 317 for codewords $CW_{1,1}$-$CW_{1,4}$. If a performance metric $PM_{1,1}$-$PM_{1,4}$ of one or more of codewords of $CW_{1,1}$-$CW_{1,4}$ exceeds a performance metric $PM_{store}$ of previously selected codeword $CW_{select}$ at block 315, the codeword of $CW_{1,1}$-$CW_{1,4}$ providing the highest performance may be saved as $CW_{select}$ and its respective performance metric may be stored as $PM_{store}$.

After considering each of $CW_{1,1}$-$CW_{1,4}$, j is incremented to 5 at block 319 so that j>4 (i.e., j>k*M or j>1*M) at block 323, i is incremented at block 325 so that i=2, and j is initialized back to j=1. As long as i is less than or equal to I (i.e., as long as i is less than or equal to the highest rank which is 4 in this example) at block 327, blocks 325 and 327 provide iterations through blocks 309, 311, 315, 317, 319, 321, and 323 for each of the ranks of the code book. During a first iteration through blocks 309, 311, 315, 317, 319, 321, and 323 with i=1 and k=1, processor 201 may consider the first four code words of rank 1 (i.e., $CW_{1,1}$-$CW_{1,4}$). During a second iteration through blocks 309, 311, 315, 317, 319, 321, and 323 with i=2 and k=1, processor 201 may consider the first four code words of rank 2 (i.e., $CW_{2,1}$-$CW_{2,4}$). During a third iteration through blocks 309, 311, 315, 317, 319, 321, and 323 with i=3 and k=1, processor 201 may consider the first four code words of rank 3 (i.e., $CW_{3,1}$-$CW_{3,4}$). During a fourth iteration through blocks 309, 311, 315, 317, 319, 321, and 323 with i=4 and k=1, processor 201 may consider the first four code words of rank 4 (i.e., $CW_{4,1}$-$CW_{4,4}$).

Once i has been incremented to a value exceeding the highest rank I (i.e., i>4 in the example being discussed) at block 327, processor 201 may provide channel state information (CSI) including an identification of the most recently selected codeword $CW_{select}$ identified in memory at block 329, and the channel state information may be transmitted through transceiver 209 and antenna(s) 217 over wireless channel 300 to base station. More particularly, the channel state information may include a codeword index identifying the selected codeword $CW_{select}$. Moreover, i and j may be initialized to one and k may be incremented at block 331. Provided that k does not exceed K (e.g., K=4 in the example being discussed) at block 333, processor 201 may return to block 303 to await a next transmission timing interval. If k does exceed K at block 333, i, j, and k may all be initialized to 1 at block 335 before returning to block 303 to await a next transmission timing interval.

For each transmission timing interval corresponding to a respective value of k (e.g., k=1, 2, 3, or 4), processor 201 may provide iterations through blocks 309, 311, 315, 317, 319, 321, 323, 325, and 327 to provide consideration of a respective plurality of the codewords, and processor 201 may consider all of the codewords of the codebook over K transmission timing intervals. For example, during a first transition time interval starting at block 303 with k=1, processor may consider 4 codewords for each rank ($CW_{1,1}$-$CW_{1,4}$, $CW_{2,1}$-$CW_{2,4}$, $CW_{3,1}$-$CW_{3,4}$, and $CW_{4,1}$-$CW_{4,4}$) from i=1 to i=4 and j=1 to j=4 (i.e., to j=k*M=1*4=4). During a second transition time interval starting at block 303 with k=2, processor may consider 4 codewords for each rank ($CW_{1,5}$-$CW_{1,8}$, $CW_{2,5}$-$CW_{2,8}$, $CW_{3,5}$-$CW_{3,8}$, and $CW_{4,5}$-$CW_{4,8}$) from i=1 to i=4 and j=5 to j=8 (i.e., to j=k*M=2*4=8). During a third transition time interval starting at block 303 with k=3, processor may considers 4 codewords for each rank ($CW_{1,9}$-$CW_{1,12}$, $CW_{2,9}$-$CW_{2,12}$, $CW_{3,9}$-$CW_{3,12}$, and $CW_{4,9}$-$CW_{4,12}$) from i=1 to i=4 and j=9 to j=12 (i.e., to j=k*M=3*4=12). During a fourth transition time interval starting at block 303 with k=4, processor may consider 4 codewords for each rank ($CW_{1,13}$-$CW_{1,16}$, $CW_{2,13}$-$CW_{2,16}$, $CW_{3,13}$-$CW_{3,16}$, and $CW_{4,13}$-$CW_{4,16}$) from i=1 to i=4 and j=13 to j=16 (i.e., to j=k*M=4*4=16).

As shown in FIG. 3, channel state information may be provided to base station 100 at block 329 once for each transmission timing interval. The channel state information may be provided for the same selected codeword $CW_{select}$ over consecutive transmission timing intervals until another codeword provides a higher performance. According to some other embodiments, processor 201 may only provide channel state information for base station 100 once every codeword has been considered (e.g., once processor 201 has incremented past a highest value of k at the No output of block 333). For example, operations of block 329 may be implemented in block 335. In this case, the Yes output of block 333 may loop back to the input of block 303 as shown, and the output of block 335 (including operations of block 329) may loop back to the input of block 301, so that channel state information is only provided after considering all codewords of the codebook.

According to some other embodiments, the Yes output of block 333 may loop back to the input of block 303 as shown in Figure, but the output of block 335 may loop back to the input of block 301 and blocks 305 and 307 may be omitted. In such an embodiment, operations of block 329 may be performed with operations of block 335 after determining at block 333 that k is greater than K. Accordingly, all codewords may be evaluated over K transmission timing intervals before reporting channel state information including the selected codeword.

Figure 4:
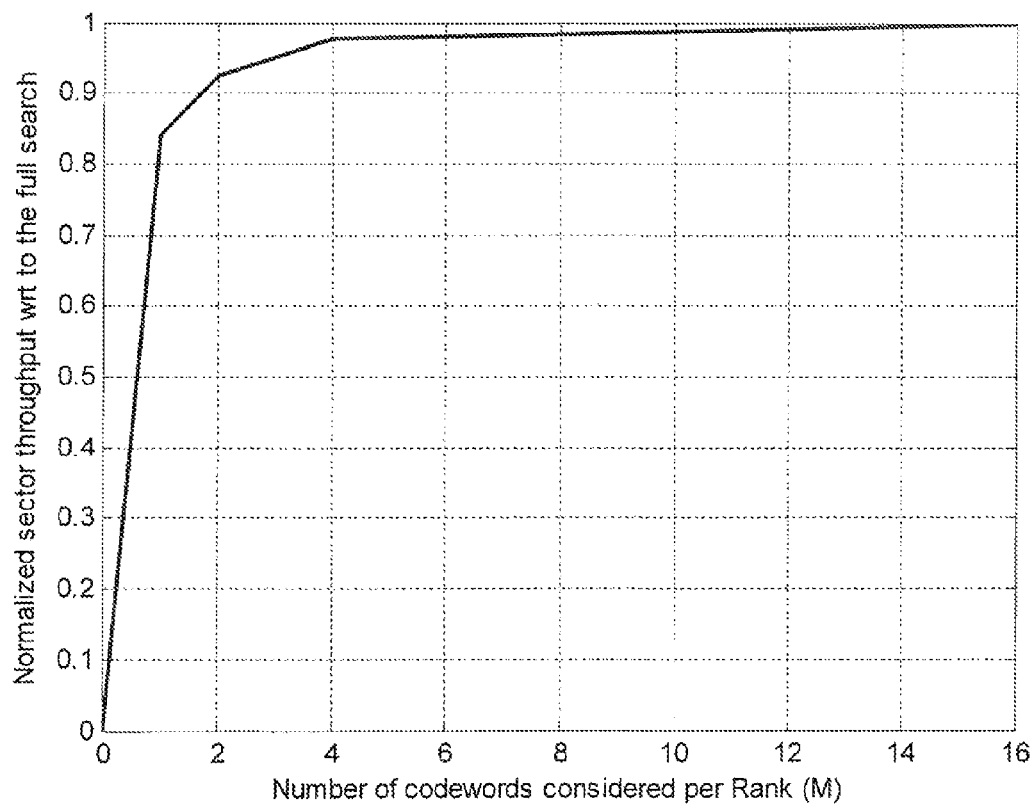
FIGS. 4 and 5 are graphs illustrating system performance as a function of numbers of codewords considered per rank according to some embodiments.
Figure 5:
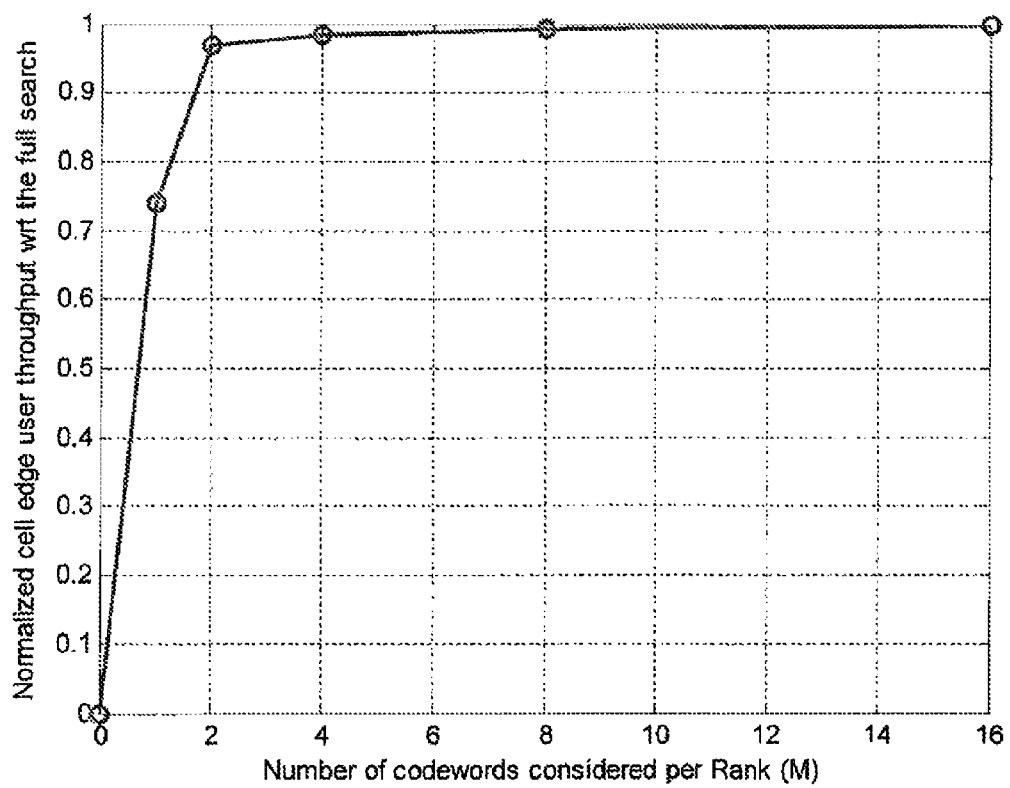

FIGS. 4 and 5 are graphs illustrating simulated system performance as a function of a number of codewords M that are considered per rank during each transmission timing interval TTI according to embodiments discussed above with respect FIG. 3 in a system with four MIMO antennas providing four transmission layers or ranks (I=4) using a 64 codeword codebook (L=64) with 16 codewords provided for each rank (J=16) in the context of a 3GPP LTE downlink. Moreover, antenna patterns and shadowing models are included per 3GPP evaluation methodologies, and results are presented using a frequency reuse of one. Synchronous and non-adaptive HARQ (hybrid automatic repeat request) with a maximum of 6 retransmissions is assumed. Moreover, simulations assume Typical Urban (TU) channel model-A with 6 multipath components with a 3GPP LTE downlink power delay profile, and perfect channel estimation at the receiver (e.g., at wireless terminal 200) is assumed.

FIG. 4 shows sector throughput performance with different numbers of codewords M that are considered per rank. In FIG. 4 with I=4, J=16, and L=64 according to a conventional 3GPP LTE downlink, all codewords of all ranks are considered during each transmission timing interval so that all 16 codewords of each rank are considered during each transmission timing interval. Stated in other words, M=16 in a conventional 3GPP LTE downlink in FIG. 4, and sector throughput for the conventional 3GPP LTE downlink (i.e., M=16) is normalized to 1. For M less than 16 according to embodiments of the present invention in FIG. 4, the normalized sector throughput is thus provided as a fraction of the conventional throughput with M=16.

In the example discussed above with respect to FIG. 3 with four ranks (I=4) and 64 codewords (L=64) divided into four pluralities/groups (K=4), 16 codewords are considered during each transmission timing interval (L/K), and 4 codewords (M=4) of each rank are considered during each transition timing interval. Accordingly, a number of computations used to evaluate codewords where M=4 may be reduced by about ¼ relative to consideration of all codewords where M=16, while maintaining a normalized sector throughput that is about 0.9767 that provided by considering all codewords at every transmission timing interval where M=16. A computation/processing overhead at wireless terminal 200 may thus be significantly reduced without significantly reducing sector throughput. Performance degradation may thus be relatively insignificant for values of M greater than or equal to 4.

FIG. 5 shows cell edge throughput performance with different numbers of codewords M that are considered per rank. In FIG. 5 with I=4, J=16, and L=64 according to a conventional 3GPP LTE downlink, all codewords of all ranks are considered during each transmission timing interval so that all 16 codewords of each rank are considered during each transmission timing interval. Stated in other words, M=16 in a conventional 3GPP LTE downlink in FIG. 5, and cell edge throughput for the conventional 3GPP LTE downlink (i.e., M=16) is normalized to 1. For M less than 16 according to embodiments of the present invention in FIG. 5, the normalized cell edge throughput is thus provided as a fraction of the conventional cell edge throughput with M=16.

In the example discussed above with respect to FIG. 3 with four ranks (I=4) and 64 codewords (L=64) divided into four pluralities/groups (K=4), 16 codewords are considered during each transmission timing interval (L/K), and 4 codewords (M=4) of each rank are considered during each transition timing interval. Accordingly, a number of computations used to evaluate codewords where M=4 may be reduced by about ¼ relative to consideration of all codewords where M=16, while maintaining a normalized cell edge throughput that is about 0.9826 that provided by considering all codewords at every transmission timing interval where M=16. A computation/processing overhead at wireless terminal 200 may thus be significantly reduced without significantly reducing cell edge throughput. Performance degradation may thus be relatively insignificant for values of M greater than or equal to 4.

Table 4 below shows results of simulations used to generate data provided in the graphs of FIGS. 4 and 5.

TABLE 4

Throughput (TP) values with different values of M

| M | Sector TP (Mbps) | Cell Edge TP (Mbps) | % Reduction wrt Full Search Sector TP | Cell Edge TP |
|---|---|---|---|---|
| 0 | 0 | 0 | 100% (0) | 100% (0) |
| 1 | 21823.5 | 197.196 | 15.84% (.84) | 25.88% (.74) |
| 2 | 23941.9 | 257.921 | 7.76% (.92) | 3.05% (.97) |
| 4 | 25326.3 | 261.398 | 2.33% (.98) | 1.74% (.98) |
| 8 | 25491.9 | 263.731 | 1.7% (.98) | 0.86% (.99) |
| 16 | 25931.6 | 266.024 | N/A (1) | N/A (1) |

With M=8 (with L=64, I=4, J=16, and K=2 so that two TTIs are required to consider all codewords), computation/processing overhead may be reduced by about ½ while maintaining respective normalized sector and cell edge throughputs (TPs) of 0.98 and 0.99 relative to conventional approaches where M=16. With M=4 (with L=64, I=4, J=16, and K=4 so that four TTIs are required to consider all codewords), computation/processing overhead may be reduced by about ¼ while maintaining respective normalized sector and cell edge throughputs (TPs) of 0.98 and 0.98 relative to conventional approaches where M=16. With M=2 (with L=64, I=4, J=16, and K=8 so that eight TTIs are required to consider all codewords), computation/processing overhead may be reduced by about ⅛ while maintaining respective normalized sector and cell edge throughputs (TPs) of 0.92 and 0.97 relative to conventional approaches where M=16. With M=1 (with L=64, I=4, J=16, and K=16 so that sixteen TTIs are required to consider all codewords), computation/processing overhead may be reduced by about 1/16 while maintaining respective normalized sector and cell edge throughputs (TPs) of 0.84 and 0.74 relative to conventional approaches where M=16.

FIG. 6 is a flow chart illustrating additional embodiments providing channel state information (CSI) for wireless terminal 200 receiving downlink transmissions from base station 100 over a multiple input multiple output (MIMO) wireless channel. At block 601, different pluralities of precoding codewords of a precoding codebook may be defined at processor 201 and/or memory 218. As discussed above with respect to FIG. 3 and Table 3, for example, each plurality of precoding codewords may include precoding codewords from each of a plurality of transmission layer groups, but other divisions may be provided. For example, each plurality of codewords may be defined as codewords of a same transmission group layer or rank as shown below in Table 5.

TABLE 5

Alternative Precoding Codebook for a 4 antenna system with 64 codewords

| Group | Codewords ($CW_{i,j}$) For Each Plurality |
|---|---|
| k = 1 | $CW_{1,1}$-$CW_{1,16}$ |
| k = 2 | $CW_{2,1}$-$CW_{2,16}$ |
| k = 3 | $CW_{3,1}$-$CW_{3,16}$ |
| k = 4 | $CW_{4,1}$-$CW_{4,16}$ |

At block 603 of FIG. 6, (before a codeword has been selected on the basis of performance), processor 201 may initialize the value k=1 used to iterate through the different pluralities of codewords, and processor 201 may initialize stored performance metric $PM_{store}$ to zero. At block 605, processor 201 may wait until a next transmission timing interval before proceeding with evaluation of codewords. Once a next transmission timing interval has arrived at block 605, processor 201 may determine if a codeword of the codebook has been previously selected for the downlink from base station 100 to wireless terminal 200 at block 607. If a previously selected codeword $CW_{select}$ is currently in use at block 607, processor 201 may compute a current performance metric (e.g., based on efficiency and/or capacity) for the previously selected codeword based on current downlink transmissions, and processor 201 may save the current performance metric for the previously selected codeword as $PM_{store}$ at block 609. If no codeword has been has been previously selected at block 607, $PM_{store}$ be maintained as zero from block 603.

At block 611, processor 201 may measure downlink characteristics of wireless channel 300 for codewords of the plurality of codewords corresponding to the current value of k that are being considered. At block 615, processor 201 may determine respective performance metrics $PM_{i,j}$ for respective ones of the plurality of precoding codewords defined at block 601 corresponding to a current value of k based on the measurements of block 611. At block 617, if any of the performance metrics $PM_{i,j}$ determined at blocks 611 and 615 exceeds the stored performance metric $PM_{store}$ (indicating that at least one codeword from the group will provide improved performance relative to the previously stored codeword $CW_{select}$), then at block 619, the codeword $CW_{i,j}$ providing the highest performance metric is saved in memory as $CW_{select}$, and the corresponding performance metric $PM_{i,j}$ is saved in memory 218 as the stored performance metric $PM_{store}$ for future comparisons.

At block 621, processor 201 may increment k in preparation for a next transmission timing interval, and at block 623, processor 201 may provide channel state information including an identification of the currently selected codeword $CW_{select}$. Provided that k (after the iteration of block 621) is less than or equal to K at block 625, processor may return to block 605 to await a next transmission timing interval. Otherwise, processor 201 may initialize k to 1 at block 627 before returning to block 605.

In the flow chart of FIG. 6, one plurality of codewords corresponding to a value of k is evaluated at blocks 611, 615, 617, and 619 during each transmission timing interval. Accordingly, K transmission timing intervals are required to evaluate all codewords of the codebook. While K pluralities of codewords may be provided as discussed above with respect Table 3 and FIG. 3, other arrangements are possible. For example, each plurality of codewords may be defined as codewords of a respective transmission layer group or rank. According to still other embodiments, each plurality of codewords may be randomly selected from the codebook.

FIG. 7 is a flow chart illustrating additional embodiments providing channel state information (CSI) for wireless terminal 200 receiving downlink transmissions from base station 100 over a multiple input multiple output (MIMO) wireless channel using precoding codewords of a precoding codebook. At block 701, different pluralities of precoding codewords of a precoding codebook may be defined at processor 201 and/or memory 218. As discussed above with respect to FIGS. 3 and 6 and Table 3, for example, each plurality of precoding codewords may include precoding codewords from each of a plurality of transmission layer groups, but other divisions may be provided. The base station 100 and/or wireless terminal 200 may support communications over the multiple input multiple output wireless channel using a plurality of transmission layers, and the precoding codewords of the precoding codebook may be divided into transmission layer groups with each transmission layer group of precoding codewords being provided for a respective one of the transmission layers.

During a first transmission time interval at block 705a, processor 201 may determine at block 715a respective performance metrics for a first plurality of precoding codewords of the precoding codebook for the MIMO wireless channel based on transmissions received at wireless terminal 200 from base station 100. During a second transmission time interval at block 715b, processor 201 may determine at block 715b respective performance metrics for a second plurality of precoding codewords of the precoding codebook for the MIMO wireless channel based on transmissions received at wireless terminal 200 from base station 100. During a third transmission time interval at block 705c, processor 201 may determine at bock 715c respective performance metrics for a third plurality of precoding codewords of the precoding codebook for the MIMO wireless channel based on transmissions received at the first communications device from the second communication device. During a fourth transmission time interval at block 715d, processor 201 may determine at block 715d respective performance metrics for a fourth plurality of precoding codewords of the precoding codebook for the MIMO wireless channel based on transmissions received at wireless terminal 200 from base station 100. As discussed above the first, second, third, and fourth pluralities of precoding codewords may be different.

A precoding codeword may be selected at block 719 from one of the first, second, third, and fourth pluralities of precoding codewords based on the respective performance metrics of the first, second, third, and fourth pluralities of precoding codewords. Moreover, channel state information may be provided from base station 200 to wireless terminal 100, and the channel state information includes information identifying the selected precoding codeword. In FIG. 7, operations of blocks 705a-d, 715a-d, 719, and 723 may be repeated so that all precoding codewords are repeatedly evaluated during communications between base station 100 and wireless terminal 200. Moreover, operations illustrated in dotted lines may be optional according to some embodiments of the present invention.

As discussed above with respect to FIGS. 3, 6, and 7 by way of example, a select codeword may be stored in wireless terminal memory as $CW_{select}$, and the selected codeword $CW_{select}$ may be reported to the base station. According to other embodiments, the wireless terminal processor may instead save and/or report an identification (e.g., an index) that identifies the selected codeword. Memory and/or communication resources may thus be conserved by saving and/or reporting an identification of the selected codeword that is shorter than the selected codeword. A 6-bit identification number or index, for example, may be used to uniquely identify each of 64 codewords, while each of the codewords may be significantly longer than 6 bits.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices)

and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed:

1. A method of providing channel state information, CSI, for a first communication device communicating with a second communication device over a multiple input multiple output, MIMO, wireless channel using precoding codewords of a precoding codebook, wherein the first and/or second communication devices support communications over the MIMO wireless channel using a plurality of transmission layers, and wherein the precoding codewords of the precoding codebook are divided into transmission layer groups with each transmission layer group of precoding codewords being provided for a respective one of the transmission layers, the method comprising:

defining at least a first and a second plurality of precoding codewords of the precoding codebook wherein each of the at least first and second plurality of precoding codewords includes precoding codewords from each of the transmission layer groups;

during a first transmission time interval, determining respective performance metrics for the first plurality of precoding codewords of the precoding codebook for the MIMO wireless channel based on transmissions received at the first communications device from the second communication device; and during a second transmission time interval after the first transmission time interval, determining respective performance metrics for the second plurality of precoding codewords of the precoding codebook for the MIMO wireless channel based on transmissions received at the first communication device from the second communication device, wherein the first and second pluralities of precoding codewords are different.

2. The method according to claim 1 further comprising:

selecting a precoding codeword from one of the first and second plurality of precoding codewords based on the respective performance metrics of the first and second plurality of precoding codewords; and reporting channel state information from the first communication device to the second communication device, wherein the channel state information includes information identifying the selected precoding codeword.

3. The method according to claim 1 wherein each of the first and second pluralities of precoding codewords includes a same number of precoding codewords.

4. The method according to claim 1 wherein each of the transmission layer groups includes a same number of precoding codewords.

5. The method according to claim 1 wherein defining at least first and second pluralities of precoding codewords further comprises defining third and fourth pluralities of precoding codewords wherein each of the third and fourth pluralities of precoding codewords includes precoding codewords from each of the transmission layer groups, the method further comprising:
during a third transmission time interval after the second transmission time interval, determining respective performance metrics for the third plurality of precoding codewords of the precoding codebook for the MIMO wireless channel based on transmissions received at the first communications device from the second communication device; and
during a fourth transmission time interval after the third transmission time interval, determining respective performance metrics for the fourth plurality of precoding codewords of the precoding codebook for the MIMO wireless channel based on transmissions received at the first communications device from the second communication device, wherein the first, second, third, and fourth pluralities of precoding codewords are different.

6. The method according to claim 5 further comprising:
selecting a precoding codeword from one of the first, second, third, and fourth pluralities of precoding codewords based on the respective performance metrics of the first, second, third, and fourth pluralities of precoding codewords; and
reporting channel state information from the first communication device to the second communication device, wherein the channel state information includes information identifying the selected precoding codeword.

7. The method according to claim 1 wherein each of the transmission layer groups includes a same first number of precoding codewords, and wherein each of the different pluralities of the precoding codewords includes a same second number of precoding codewords.

8. The method according to claim 1 wherein each of the transmission layer groups of precoding codewords are mutually exclusive, and wherein each of the pluralities of precoding codewords are mutually exclusive.

9. A communication device comprising:
a transceiver configured to provide communications with a second communication device over a multiple input multiple output, MIMO, wireless channel using precoding codewords of a precoding codebook, wherein the communication device supports communications over the MIMO wireless channel using a plurality of transmission layers, and wherein the precoding codewords of the precoding codebook are divided into transmission layer groups with each transmission layer group of precoding codewords being provided for a respective one of the transmission layers; and
a processor coupled to the transceiver wherein the processor is configured to determine respective performance metrics for a first plurality of precoding codewords of a precoding codebook for the MIMO wireless channel based on transmissions received through the transceiver from the second communication device during a first transmission time interval, and to determine respective performance metrics for a second plurality of precoding codewords of the precoding codebook for the MIMO wireless channel based on transmissions received through the transceiver from the second communication device during a second transmission time interval after the first transmission time interval, wherein the first and second pluralities of precoding codewords are different, wherein the first plurality of precoding codewords includes precoding codewords from each of the transmission layer groups, and wherein the second plurality of precoding codewords includes precoding codewords from each of the transmission layer groups.

10. The communications device according to claim 9 wherein the processor is further configured to select a precoding codeword from one of the first and second pluralities of precoding codewords based on the respective performance metrics of the first and second pluralities of precoding codewords, and to report channel state information to the other communication device, wherein the channel state information includes information identifying the selected precoding codeword.

11. The communications device according to claim 9 wherein each of the first and second pluralities of precoding codewords includes a same number of precoding codewords.

12. The communications device according to claim 9 wherein each of the transmission layer groups includes a same number of precoding codewords.

13. The communications device according to claim 9 wherein the processor is further configured to determine respective performance metrics for a third plurality of precoding codewords of the precoding codebook for the MIMO wireless channel based on transmissions received through the transceiver from the second communication device during a third transmission time interval after the second transmission time interval, and to determine respective performance metrics for a fourth plurality of precoding codewords of the precoding codebook for the MIMO wireless channel based on transmissions received through the transceiver from the second communication device during a fourth transmission time interval after the third transmission time interval, wherein the first, second, third, and fourth pluralities of precoding codewords are different, wherein the third plurality of precoding codewords includes precoding codewords from each of the transmission layer groups, and wherein the fourth plurality of precoding codewords includes precoding codewords from each of the transmission layer groups.

14. The communications device according to claim 9 wherein the processor is further configured to select a precoding codeword from the precoding codebook based on the respective performance metrics, and to report channel state information to the second communication device, wherein the channel state information includes information identifying the selected precoding codeword.

15. The communications device according to claim 9 wherein each of the different transmission layer groups includes a same first number of precoding codewords, and wherein each of the different pluralities of the precoding codewords includes a same second number of precoding codewords.

16. The communications device according to claim 9 wherein each of the transmission layer groups of precoding codewords are mutually exclusive, and wherein each of the pluralities of precoding codewords are mutually exclusive.

* * * * *